United States Patent
Qiu et al.

(10) Patent No.: US 8,497,650 B2
(45) Date of Patent: Jul. 30, 2013

(54) FAN DELAY CONTROL CIRCUIT

(75) Inventors: Xun-Chun Qiu, Shenzhen (CN);
Guang-Dong Yuan, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 101 days.

(21) Appl. No.: 13/219,724

(22) Filed: Aug. 29, 2011

(65) Prior Publication Data
US 2012/0326648 A1    Dec. 27, 2012

(30) Foreign Application Priority Data
Jun. 24, 2011    (CN) .................. 2011 2 0217434 U

(51) Int. Cl.
*G05B 5/00* (2006.01)
*H02H 7/08* (2006.01)
*H02P 1/00* (2006.01)
*H02P 3/00* (2006.01)

(52) U.S. Cl.
USPC ...... 318/452; 318/599; 318/811; 318/400.13; 318/400.3; 318/484

(58) Field of Classification Search
USPC .......... 318/452, 599, 811, 400.13, 400.3, 318/484
See application file for complete search history.

(56) References Cited

U.S. PATENT DOCUMENTS

| | | | |
|---|---|---|---|
| 6,040,668 A * | 3/2000 | Huynh et al. | 318/471 |
| 7,096,134 B2 * | 8/2006 | Miller, Jr. | 702/79 |
| 7,352,147 B2 * | 4/2008 | Chou | 318/471 |
| 2006/0076912 A1 * | 4/2006 | Yang et al. | 318/254 |

* cited by examiner

*Primary Examiner* — Erick Glass
(74) *Attorney, Agent, or Firm* — Altis Law Group, Inc.

(57) ABSTRACT

A fan delay control circuit includes a fan connector connected to a fan of an electronic device, a power supplying module connected to the fan connector, and a rotational speed controlling module connected to the power supplying module. The power supplying module is connected to a fan power source and a stand-by power source. The power supplying module may continue to supply power to the fan when the electronic device including the fan is powered off. The rotational speed controlling module includes a square wave generation circuit which generates a square wave signal to control a rotational speed of the fan even when the electronic device is powered off.

10 Claims, 2 Drawing Sheets

FAN DELAY CONTROL CIRCUIT

BACKGROUND

1. Technical Field

The exemplary disclosure generally relates to fan control circuits, particularly to fan delay control circuits.

2. Description of Related Art

A typical cooling fan for an electronic device, such as a computer, stops rotating when the electronic device powers off, but remaining heat from the computer dissipates very slowly. Temperature in the electronic device does not go down quickly when the ambient temperature is high.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary fan delay control circuit. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
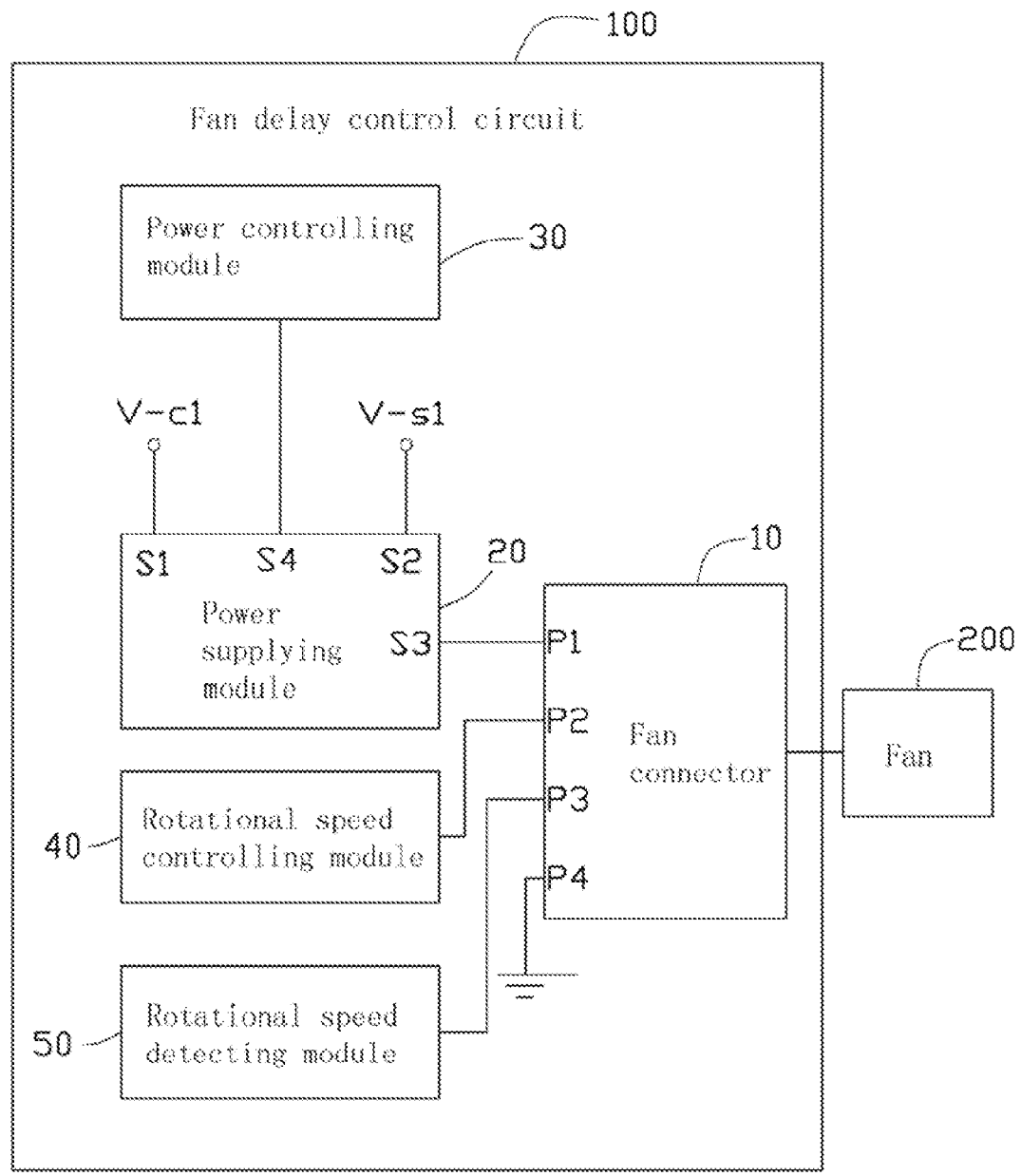
FIG. 1 shows a block diagram of an exemplary embodiment of a fan delay control circuit.

Referring to FIG. 1, an exemplary embodiment of a fan delay control circuit is used to control a fan 200 of a computer. The fan delay control circuit 100 includes a fan connector 10, a power supplying module 20, a power controlling module 30, a rotational speed controlling module 40, and a rotational speed detecting module 50.

The fan connector 10 is connected to the fan 200. The fan connector 10 includes a power terminal P1, a controlling terminal P2, a detecting terminal P3, and a ground terminal P4. The ground terminal P4 is connected to ground.

The power supplying module 20 includes a first terminal 51, a second terminal S2, a third terminal S3, and a fourth terminal S4. The first terminal 51 is electrically connected to a fan power source V-c1 supplied by a motherboard of the computer. The second terminal S2 is electrically connected to a first stand-by power source V-s1 of the motherboard of the computer. The third terminal S3 is electrically connected to the power terminal P1 of the fan connector 10. The fourth terminal S4 is electrically connected to the power controlling module 30.

In one embodiment, the voltage of the fan power source V-c1 is +12 volts (V). The voltage of the first stand-by power source V-s1 is +5V. When the computer is powered on, the power supplying module 20 supplies the fan power source V-c1 to drive the fan 200. When the computer is powered off, the fan power source V-c1 is shut down. The voltage of the first stand-by power source V-s1 is lower than +12V (the working voltage of the fan 200), and the power supplying module 20 increases the first stand-by power source V-s1 to +12V to continue driving the fan 200.

The power controlling module 30 detects temperature inside a housing enclosure of the computer, and converts the temperature into a voltage signal. The power controlling module 30 compares the value of the voltage signal and the value of a predetermined voltage, and controls the power supplying module 20 to supply power to the fan connector 10 when the temperature inside the housing enclosure (i.e., internal temperature) is above a predetermined temperature corresponding to the predetermined voltage. The power controlling module 30 controls the power supplying module 20 to stop supplying power to the fan connector 10 only when the temperature in the housing is below the predetermined temperature corresponding to the predetermined voltage.

The rotational speed controlling module 40 is connected to the controlling terminal P2 of the fan connector 10, to control the rotational speed of the fan 200.

The rotational speed detecting module 50 is connected to the detecting terminal P3 of the fan connector 10, to detect the rotational speed of the fan 200.

Figure 2:
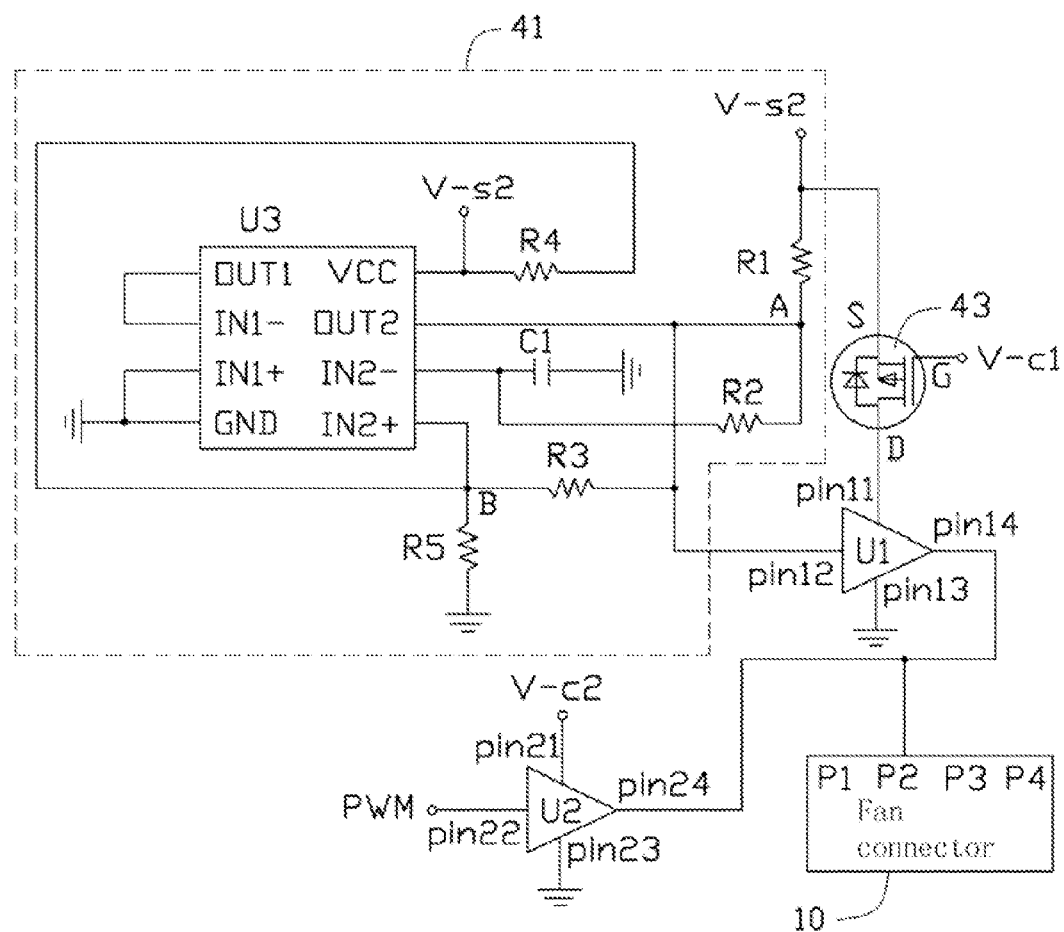
FIG. 2 is a schematic circuit diagram of an exemplary embodiment of the rotational speed controlling module of the fan delay control circuit of FIG. 1.

Referring to FIG. 2, the rotational speed controlling module 40 includes a square wave generation circuit 41, a first buffer U1, a second buffer U2, and an electronic switch 43. When the computer is powered off, the square wave generation circuit 41 generates a square wave signal and transmits the square wave signal to the fan 200 via the first buffer U1 and the fan connector 10 to control the rotational speed of the fan 200. When the computer is powered on, the second buffer U2 receives a pulse-width modulated (PWM) signal from the computer and transmits the PWM signal to the fan 200 via the fan connector 10 to control the rotational speed of the fan 200. The electronic switch 43 is used to enable the first buffer U1 to work even when the computer is powered off, and disable the first buffer U1 when the computer is powered on. The first and second buffers U1 and U2 can be voltage buffers.

In the exemplary embodiment, the square wave generation circuit 41 includes a comparator U3, a pull-high resistor R1, a first resistor R2, a capacitor C1, a feedback resistor R3, a first voltage dividing resistor R4 and a second voltage dividing resistor R5. The comparator U3 is an LM393 comparator in one exemplary embodiment. The comparator U3 includes a first non-inverting input terminal IN1+, a first inverting input terminal IN1−, a first output terminal OUT1, a second non-inverting input terminal IN2+, a second inverting input terminal IN2−, a second output terminal OUT2, a power terminal VCC, and a ground terminal GND.

The pull-high resistor R1 is electrically connected between a second stand-by power source V-s2 and the second output terminal OUT2. A node between the pull-high resistor R1 and the second output terminal OUT2 is labeled "A". The first resistor R2 is electrically connected to the second inverting input terminal IN2− and to the node A. The capacitor C1 is electrically connected to ground and to a node between the first resistor R2 and the second output terminal OUT2. The feedback resistor R3 is electrically connected to the node A and the second non-inverting input terminal IN2+. A node between the feedback resistor R3 and the second non-inverting input terminal IN2+ is labeled "B". The first voltage dividing resistor R4 is electrically connected between the power terminal VCC and the node B. The second voltage dividing resistor R5 is electrically connected between the node B and ground. The power terminal VCC is further electrically connected to the second stand-by power V-s2. In the exemplary embodiment, the voltage of second stand-by power source V-s2 is +3.3V supplied by the motherboard of the computer.

When the square wave generation circuit 41 is working, if the voltage of the second non-inverting input terminal IN2+ of the comparator U3 is higher than the voltage of the second inverting input terminal IN2−, the second output terminal OUT2 outputs a high level voltage, such as +5V; if the voltage of the second non-inverting input terminal IN2+ of the comparator U3 is lower than the voltage of the second inverting input terminal IN2−, the second output terminal OUT2 outputs a low level voltage, such as 0V. The first resistor R2, the capacitor C1 and the second output terminal OUT2 cooperatively form a charging and discharging circuit. The second inverting input terminal IN2− outputs a variable voltage caused by the charging and discharging circuit charging or discharging the capacitor C1. The voltage of the second inverting input terminal IN2− is alternately higher and lower than the voltage of the second non-inverting input terminal IN2+, and thus the second output terminal OUT2 generates and outputs a variable voltage which alternates between a high level voltage and a low level voltage, such as +5V and 0V, and this is the square wave signal which is fed to the fan 200.

The feedback resistor R3, the first voltage dividing resistor R4 and the second voltage dividing resistor R5 cooperatively form a voltage dividing circuit which is used to set a threshold voltage of the second non-inverting input terminal IN2+ of the comparator U3. The feedback resistor R3 introduces a feedback to make the second non-inverting input terminal IN2+ have different threshold voltages corresponding to the high-level or low-level voltages output by the second output terminal OUT2. The second output terminal OUT2 outputs square wave signals with different duty cycles by setting different resistances of the first resistor R2, the feedback resistor R3, the first voltage dividing resistor R4 and the second voltage dividing resistor R5 and the capacitance of the capacitor C1, to apply different rotational speeds to the fan 200.

The first buffer U1 includes a power terminal pin11, an input terminal pin12, a ground terminal pin13 and a output terminal pin14. The electronic switch 43 is a p-channel metal-oxide-semiconductor field-effect transistor (PMOSFET). The power terminal pin11 is electrically connected to a drain of the PMOSFET, the input terminal pin12 is electrically connected to the node A, the ground terminal pin13 is grounded, and the output terminal pin14 is electrically connected to the controlling terminal P2 of the fan connector 10. A gate of the PMOSFET is electrically connected to the fan power source V-c1, a source of the PMOSFET is electrically connected to the second stand-by power source V-s2.

The second buffer U2 includes a power terminal pin21, an input terminal pin22, a ground terminal pin23 and a output terminal pin24. The power terminal pin21 is electrically connected to a system power source V-c2, the input terminal pin22 is used to receive a PWM signal, the ground terminal pin23 is grounded and the output terminal pin24 is electrically connected to the controlling terminal P2 of the fan connector 10. The system power source V-c2 is supplied by the motherboard of the computer and the voltage of the system power source V-c2 is +3.3V. The PWM signal is supplied by an I/O controlling chip of the motherboard which adjusts the duty cycle of the PWM signal fed to the fan 200 according to the temperature of the housing.

When the computer is powered on, the voltage of the drain of the PMOSFET is +12V from the fan power source V-c1, the voltage of the source of the PMOSFET is +3.3V supplied by the second stand-by power source V-s2, the electric switch 43, (the PMOSFET), is turned off to deactivate the first buffer U1. The system power source V-c2, the PWM signal and the second buffer U2 control the rotational speed of the fan 200. When the computer is turned off, the voltage of the drain of the PMOSFET is 0V, the voltage of the source of the PMOS-FET is +3.3V supplied by the system power source V-s2, the electric switch 43, i.e. the PMOSFET is turned on and drives the first buffer U1. The square wave signal output from the square wave generation circuit 41 controls the rotational speed of the fan 200.

The fan delay control circuit 100 uses the square wave generation circuit 41 to generate a square wave signal to control the rotational speed of the fan 200 when the computer is powered off, allowing the fan 200 to continue rotating at an appropriate speed even when the computer is powered off.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A fan delay control circuit, comprising:
    a fan connector electrically connected to a fan of an electronic device comprising a housing enclosure;
    a power supplying module electrically connected to the fan connector, wherein the power supplying module comprises a first terminal electrically connected to a fan power source, a second terminal electrically connected to a first stand-by power source, and a third terminal electrically connected to the fan connector, the power supplying module supplies power from the fan power source to the fan via the fan connector when the electronic device is powered on, and boosts the first stand-by power source and supplies the boosted power source to the fan via the fan connector when the electronic device is powered off; and
    a rotational controlling module comprising a first voltage buffer and a square wave generation circuit that is electrically connected to the fan connector via the first voltage buffer, wherein when the electronic device is powered off, the square wave generation circuit generates a square-wave signal to control rotational speed of the fan.

2. The fan delay control circuit as claimed in claim 1, wherein the voltage of the fan power source is +12 volts, and the voltage of the stand-by power source is +5 volts.

3. The fan delay control circuit as claimed in claim 1, wherein the rotational speed controlling module further comprises a electronic switch used to enable the first voltage buffer to work when the electronic device is powered off, and disable the first voltage buffer when the electronic device is powered on.

4. The fan delay control circuit as claimed in claim 3, further comprising a second stand-by power source, wherein the electronic switch is a p-channel metal oxide semiconductor field effect transistor (PMOSFET), the first voltage buffer includes a power terminal, a drain of the PMOSFET is electrically connected to the power terminal of the first voltage buffer, a gate of the PMOSFET is electrically connected to the fan power source, a source of the PMOSFET is electrically connected to the second stand-by power source.

5. The fan delay control circuit as claimed in claim 4, wherein the voltage of the second stand-by power source is +3.3 volts.

6. The fan delay control circuit as claimed in claim 4, wherein the fan comprises a controlling terminal, the square wave generation circuit comprises a comparator, a pull-high resistor, a first resistor and a capacitor, the comparator includes a non-inverting input terminal, an inverting input terminal, an output terminal and a power terminal, the pull-high resistor is electrically connected between the second stand-by power and the output terminal of the comparator, the first resistor is electrically connected between the inverting input terminal of the comparator and a node between the pull-high resistor and the output terminal of the comparator, the capacitor is electrically connected between ground and a node between the first resistor and the output terminal of the comparator, the power terminal of the comparator is electrically connected to the second stand-by power source, the input terminal of the first voltage buffer is electrically connected between the output terminal of the comparator and the pull-high resistor, the output terminal of the first voltage buffer is electrically connected to controlling terminal of the fan connector.

7. The fan delay control circuit as claimed in claim 6, wherein the rotational speed controlling module further comprises a second voltage buffer electrically connected to the controlling terminal of the fan connector, the second voltage buffer is used to receive a pulse-width modulated (PWM) signal from the electronic device that is used to adjust the duty cycle of the PWM signal fed to the fan according to internal temperature of the housing enclosure.

8. The fan delay control circuit as claimed in claim 6, wherein the square wave generation module further comprises a feedback resistor, a first voltage dividing resistor and a second voltage resistor, the feedback resistor is electrically connected between the non-inverting input terminal of the comparator and a node between the pull-high resistor and the output terminal of the comparator, the first voltage dividing resistor is electrically connected to the power terminal of the comparator and to a node between the feedback resistor and the non-inverting input terminal of the comparator, the second voltage dividing resistor is electrically connected a node between the feedback resistor and the non-inverting input terminal of the comparator and to ground.

9. The fan delay control circuit as claimed in claim 1, further comprising a power controlling module electrically connected to the power supplying module, wherein when the electronic device is powered off, the power controlling module controls the power supplying module to stop supplying power to the connector when an ambient temperature within the enclosure is lower than a predetermined value.

10. The fan delay control circuit as claimed in claim 1, further comprising a rotational speed controlling module, the fan connector further comprises a controlling terminal, wherein the rotational speed controlling module is connected to the detecting terminal of the connector, the rotational speed detecting module is used to detect rotational speed of the fan.

* * * * *